May 22, 1945.   K. PAPELLO   2,376,719
APPARATUS FOR DETERMINING THE MAGNITUDES
REQUIRED FOR PARALLAX CORRECTION
Filed June 7, 1938   3 Sheets-Sheet 1

*Inventor:*
Karl Papello

May 22, 1945.   K. PAPELLO   2,376,719
APPARATUS FOR DETERMINING THE MAGNITUDES
REQUIRED FOR PARALLAX CORRECTION
Filed June 7, 1938   3 Sheets-Sheet 2

Inventor:
Karl Papello

Patented May 22, 1945

2,376,719

UNITED STATES PATENT OFFICE

2,376,719

APPARATUS FOR DETERMINING THE MAGNITUDES REQUIRED FOR PARALLAX CORRECTION

Karl Papello, Jena, Germany; vested in the Alien Property Custodian

Application June 7, 1938, Serial No. 212,349
In Germany May 4, 1934

9 Claims. (Cl. 235—61.5)

The invention refers to an apparatus in which the parallax correction required for laying an anti-aircraft gun positioned at a certain distance from the apparatus is determined by means of the range E of the aircraft from the apparatus, the horizontal distance $s$ of the gun from the apparatus, the lateral angle $\alpha$ between the lines of sight from the apparatus to the aircraft and to the gun, and the elevational angle $\beta$ of the line of sight from the apparatus to the aircraft.

The invention aims at considerably simplifying the construction of such apparatus by providing three cam systems each of which comprises a plurality of cams arranged in series or trains and each effecting two different motions, for instance a rotation and a displacement, and so constructed and connected to each other and to driving mechanisms feeding the known magnitudes E, $s$, $\alpha$ and $\beta$ that the rearmost cams of the three systems furnish respectively the difference, $\Delta\alpha$ of the lateral angles included between a definite reference line and the lines of sight from the apparatus and the gun to the aircraft, the difference $\Delta\beta$ of the elevational angles of the lines of sight from the apparatus and the gun to the aircraft, and the difference $\Delta E$ of the ranges of the aircraft from the apparatus and the gun, the said magnitudes $\Delta\alpha$, $\Delta\beta$ and $\Delta E$ corresponding to the equations $$(I) \quad \Delta\alpha = \arcsin \frac{s.\sin\alpha}{(E \pm \Delta E).\cos(\beta \pm \Delta\beta)}$$

$$(II) \quad \Delta\beta = \arcsin \frac{s.\cos\left(\alpha \pm \frac{\Delta\alpha}{2}\right)\sin\beta}{E \pm \Delta E}$$

and $$(III) \quad \Delta E = s.\cos\left(\alpha \pm \frac{\Delta\alpha}{2}\right).\cos\left(\beta \pm \frac{\Delta\beta}{2}\right)$$

respectively, or to approximate equations derived from these equations by substituting the sine of $\Delta\alpha$ and $\Delta\beta$ for the angle itself and, eventually, by neglecting the magnitudes $\Delta E$ and $\Delta\beta$ in Equation I, the magnitudes $\Delta E$ and $$\frac{\Delta\alpha}{2}$$

in Equation II and the magnitudes $$\frac{\Delta\alpha}{2}$$

and $$\frac{\Delta\beta}{2}$$

in Equation III.

Figure 2:
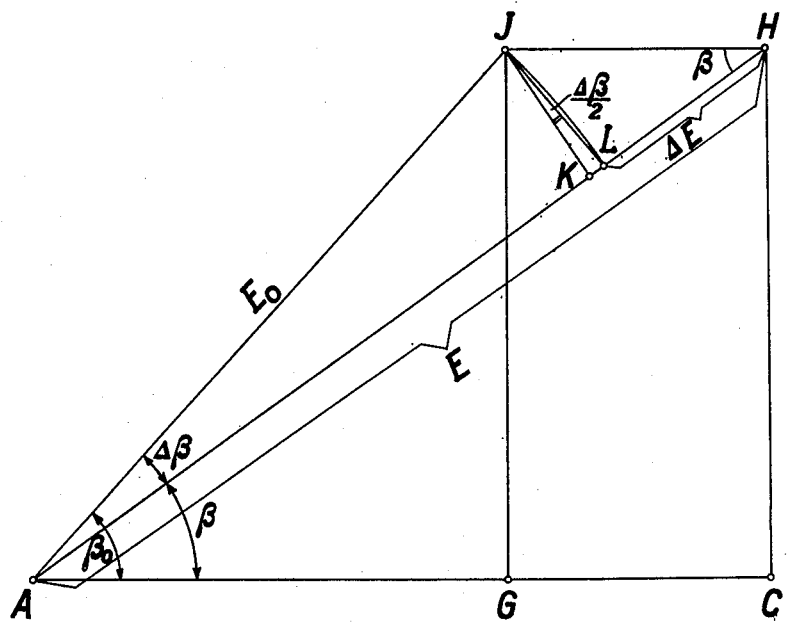
Figure 1:
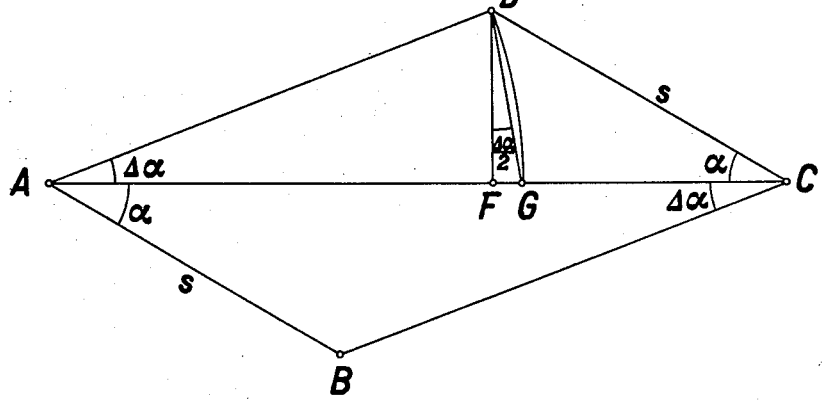
Figure 3:
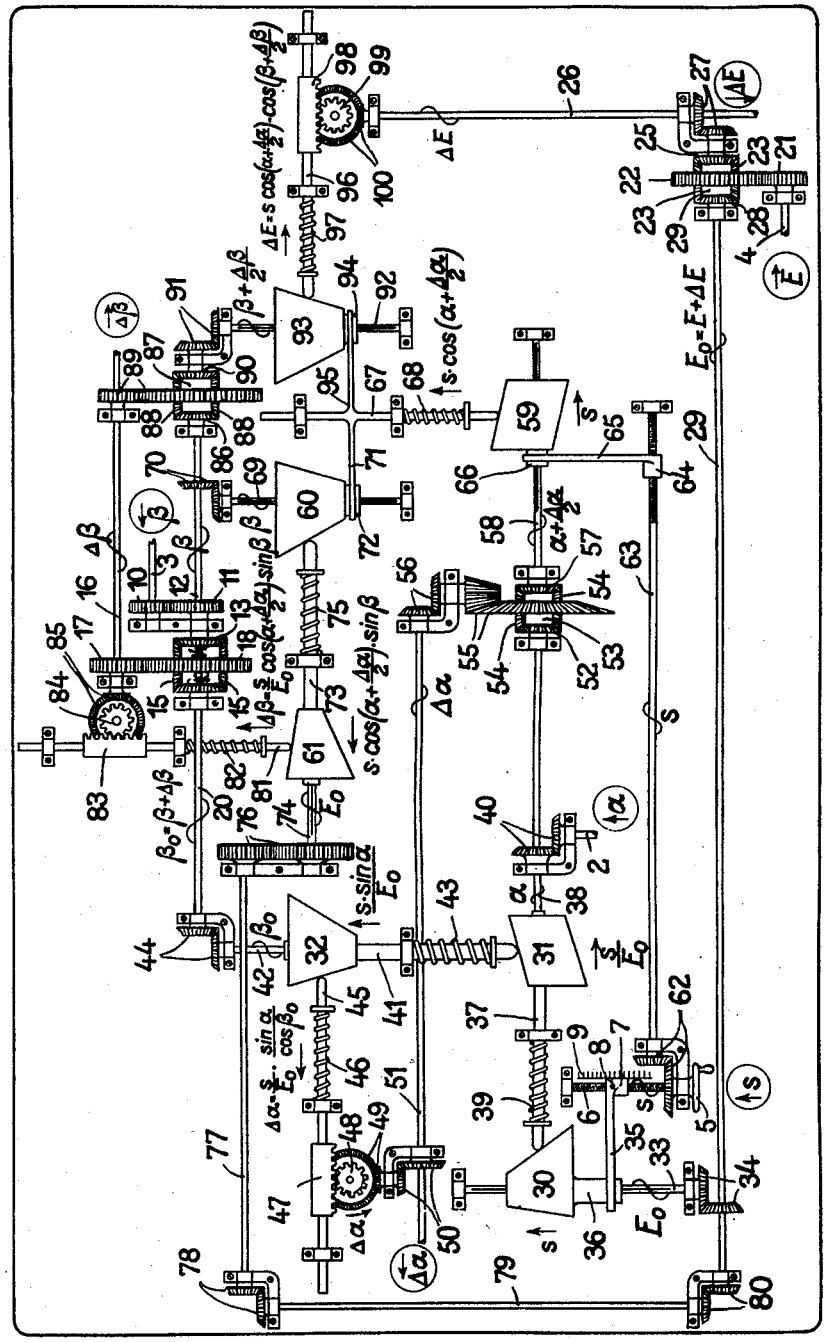
Figure 4:
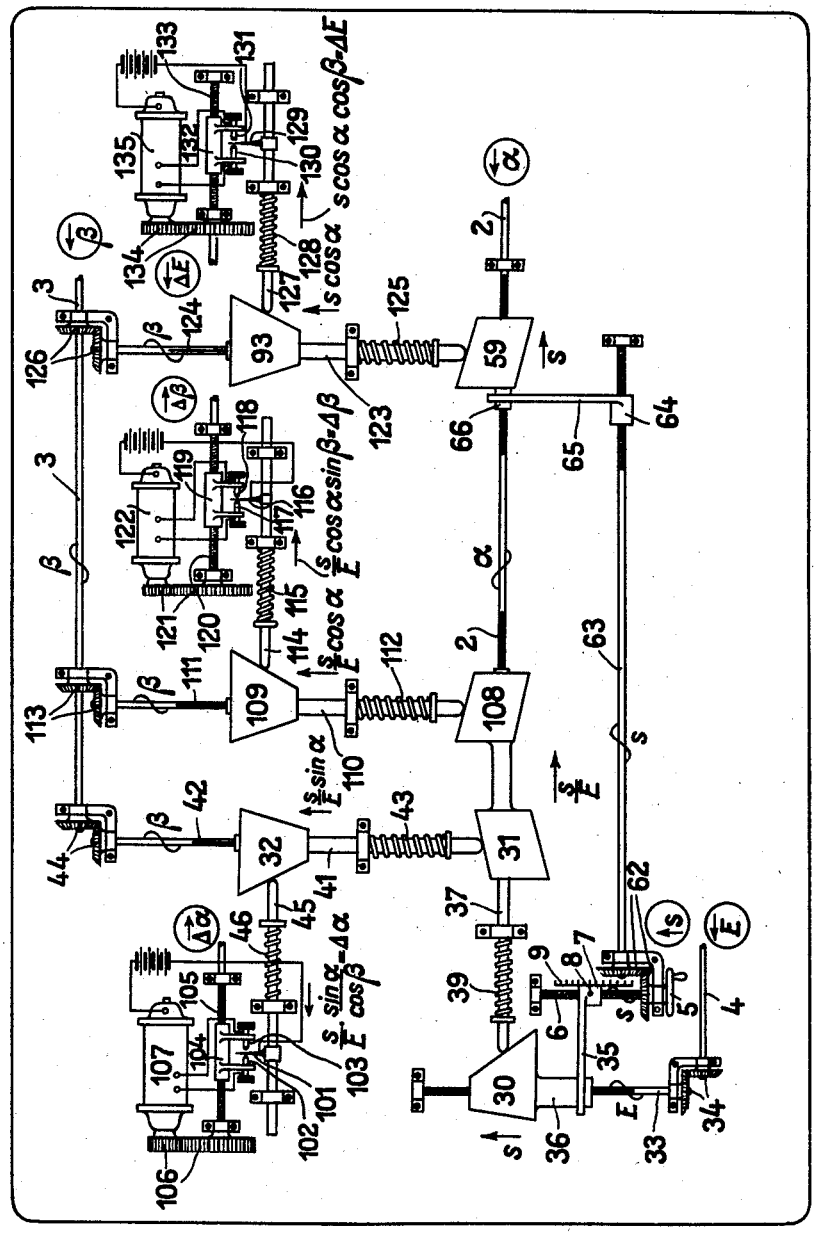

In the accompanying drawings, Figures 1 and 2 show schematically how the equations determining the sought magnitudes $\Delta\alpha$, $\Delta\beta$ and $\Delta E$ are deduced, and Figures 3 and 4 illustrate in schematic plan views two constructional examples of an apparatus according to the invention.

In Figures 1 and 2, A is the apparatus, B the gun, and H the aircraft. For the sake of simplicity, A and B are assumed to lie in a horizontal plane. C is the projection of H in this plane. D is an auxiliary point lying in this plane and so positioned that $CD=AB=s$ and $$\angle ACD = \angle CAB = \alpha$$

F is the point at which a perpendicular dropped from D intersects AC, and G is a point lying in AC and whose distance AG from A is equal to AD. The angle CAD is equal to the angle ACB and illustrative of the difference $\Delta\alpha$ of the lateral angles included between a definite reference line, i. e., the line A—B, and the lines of sight from the apparatus A and the gun B to the aircraft H. The angle FDG is half the angle CAD and therefore equal to $$\frac{\Delta\alpha}{2}$$

J is a point vertically above G and lying in the horizontal plane containing H, K is the point at which AH is intersected by a perpendicular dropped from J, and L is a point which lies in AH and whose distance AL from A is equal to AJ. $AJ=AL$ is equal to the range $E_0$ of the aircraft H from the gun B, and $AH=E$ is the range of the aircraft H from the apparatus A, so that LH is the difference $\Delta E$ of the said ranges E and $E_0$. The angle CAH, viz. the elevational angle of the line of sight from the apparatus A to the aircraft H, is designated $\beta$. $\beta$ is also the magnitude of the angle JHA. The angle GAJ is equal to the elevational angle $\beta_0$ of the line of sight from the gun B to the aircraft H. The angle $HAJ=\Delta\beta$ determines the difference between these elevational angles $\beta$ and $\beta_0$. The angle KJL is half the angle HAJ and, accordingly, $$\frac{\Delta\beta}{2}$$

It follows at once from Figures 1 and 2, due regard being had to the necessary generalizations, that $$\sin\Delta\alpha = \frac{DF}{AD} = \frac{s\sin\alpha}{E_0\cos\beta_0} = \frac{s.\sin\alpha}{(E \pm \Delta E)\cos(\beta \pm \Delta\beta)}$$

$$(I) \quad \Delta\alpha = \arcsin \frac{s\sin\alpha}{(E \pm \Delta E)\cos(\beta \pm \Delta\beta)}$$

$$\sin\Delta\beta = \frac{JK}{E_0} = \frac{JH\sin\beta}{E_0}$$

$$JH = CG = CF - FG$$

$$CF = s\cos\alpha$$

$$FG = s\sin\alpha\tan\frac{\Delta\alpha}{2}$$

and that, accordingly, $$JH = s\left(\cos\alpha \mp \sin\alpha \tan\frac{\Delta\alpha}{2}\right)$$

Assuming in the case of small angles that $$\cos\frac{\Delta\alpha}{2} = 1$$

and $$\tan\frac{\Delta\alpha}{2} = \sin\frac{\Delta\alpha}{2}$$

there is obtained $$JH = s\left(\cos\alpha\cos\frac{\Delta\alpha}{2} \mp \sin\alpha\sin\frac{\Delta\alpha}{2}\right) =$$

$$s\cos\left(\alpha \pm \frac{\Delta\alpha}{2}\right)$$

and, accordingly, $$\sin\Delta\beta = \frac{s}{E_0}\cos\left(\alpha \pm \frac{\Delta\alpha}{2}\right)\sin\beta$$

or $$(II) \qquad \Delta\beta = \arcsin\frac{s\cos\left(\alpha \pm \frac{\Delta\alpha}{2}\right)\sin\beta}{E \pm \Delta E}$$

$$\Delta E = HL = HK - KL$$

$$HK = JH\cos\beta = s\cos\left(\alpha \pm \frac{\Delta\alpha}{2}\right)\cdot\cos\beta$$

$$KL = JK\tan\frac{\Delta\beta}{2} = JH\sin\beta\tan\frac{\Delta\beta}{2} =$$

$$s\cos\left(\alpha \pm \frac{\Delta\alpha}{2}\right)\sin\beta\tan\frac{\Delta\beta}{2}$$

$$\Delta E = s\cos\left(\alpha \pm \frac{\Delta\alpha}{2}\right)\left(\cos\beta \mp \sin\beta\tan\frac{\Delta\beta}{2}\right)$$

Assuming in the case of small angles that $$\cos\frac{\Delta\beta}{2} = 1$$

and $$\tan\frac{\Delta\beta}{2} = \sin\frac{\Delta\beta}{2}$$

there is obtained $$\Delta E = s\cos\left(\alpha \pm \frac{\Delta\alpha}{2}\right)\left(\cos\beta\cdot\cos\frac{\Delta\beta}{2} \pm \sin\beta\sin\frac{\Delta\beta}{2}\right)$$

$$(III) \qquad \Delta E = s\cos\left(\alpha \pm \frac{\Delta\alpha}{2}\right)\cos\left(\beta \mp \frac{\Delta\beta}{2}\right)$$

According to the invention, the new apparatus is to furnish the magnitudes $\Delta\alpha$, $\Delta\beta$ and $\Delta E$ indicated by the Equations I to III, respectively. If slightly reduced accuracies of the magnitudes $\Delta\alpha$ or $\Delta\beta$ are disregarded for the sake of a more simple construction of the apparatus, the calculation of $\Delta\alpha$ and $\Delta\beta$ can be based on the equations $$(Ia) \qquad \Delta\alpha = \frac{s\sin\alpha}{(E \pm \Delta E)\cos(\beta \pm \Delta\beta)}$$

$$(IIa) \qquad \Delta\beta = \frac{s\cdot\cos\left(\frac{\alpha \pm \Delta\alpha}{2}\right)\sin\beta}{E \pm \Delta E}$$

which differ from the Equations I and II only in that the sines of $\Delta\alpha$ and $\Delta\beta$ are considered to be equal to the magnitude of the angle itself, as is admissible when small angles are concerned. If the demands made upon the apparatus are reduced even further, the determination of $\Delta\alpha$, $\Delta\beta$ and $\Delta E$ can be based on the equations $$(Ib) \qquad \Delta\alpha = \frac{s\sin\alpha}{E\cos\beta}$$

$$(IIb) \qquad \Delta\beta = \frac{s\cos\alpha\sin\beta}{E}$$

$$(IIIb) \qquad \Delta E = s\cos\alpha\cos\beta$$

These equations follow from the Equations Ia, IIa and III by neglection of $\Delta E$ and $\Delta\beta$ in Ia, $\Delta E$ and $\Delta\alpha$ in IIa, and $\Delta\alpha$ and $\Delta\beta$ in III.

The apparatus illustrated by Figure 3 is used for the determination of the magnitudes $\Delta\alpha$, $\Delta\beta$ and $\Delta E$ according to the Equations Ia, IIa and III. On a plate 1 are rotatably mounted three shafts 2, 3 and 4, which are assumed to be continuously rotated by other parts (not represented in the drawings) of the gunnery calculator according to the angle $\alpha$, the angle $\beta$ and the range E, respectively. By means of a hand wheel 5 and a threaded spindle 6, a slide 7 can be adjusted according to the horizontal distance $s$ of the gun from the apparatus. The correponding indicating device is designated 8, 9. The shaft 3, actuated according to $\beta$, rotates by means of a pair of spur gear wheels 10, 11 and a shaft 12 the crown wheel 13 of a differential wheel gear 14 whose planet wheels 15 are rotated by a shaft 16 (operated according to $\Delta\beta$, as explained hereinafter) and a pair of spur gear wheels 17, 18 about the axis of the shaft 12 according to $$\frac{\Delta\beta}{2}$$

so that the other crown wheel 19 of the differential wheel gear 14 and the shaft 20 fast therewith are rotated according to $\beta_0 = \beta \pm \Delta\beta$. The shaft 4 actuated according to E operates by means of a pair of spur gear wheels 21, 22 the planet wheels 23 of a differential wheel gear 24 according to E/2. The one crown wheel 25 of this gear 24 is rotated by a shaft 26 (operated according to $\Delta E$, as explained hereinafter) and a pair of bevel gear wheels 27 according to $\Delta E$, so that the other crown wheel 28 of the differential wheel gear 24 and the shaft 29 fast therewith are rotated according to $E_0 = E \pm \Delta E$.

For finding $\Delta\alpha$ use is made of a cam system comprising three cams 30, 31 and 32. The cam 30 is displaceable along a grooved shaft 33 rotatable according to $E_0$ by means of the shaft 29 and a pair of bevel gear wheels 34. The slide 7 engages by means of a fork 35 the nave 36 of the cam 30 in such a manner that this cam participates in the displacements of slide 7. The cam 30, which is thus displaced according to $s$ and rotated according to $E_0$, is so constructed that a hollow feeler 37 displaceable along a grooved shaft 38 and continuously kept in contact with the cam 30 by means of a spring 39 is adjusted according to $$\frac{s}{E_0}$$

The shaft 38 is rotated by the shaft 2 and a pair of bevel gear wheels 40 according to $\alpha$. The cam 31 is fast with the feeler 37 and therefore displaced according to $$\frac{s}{E_0}$$

and rotated according to $\alpha$. This cam 31 is so constructed that a hollow feeler 41 displaceable along a grooved shaft 42 and continuously kept in contact with the cam 31 by means of a spring 43 is adjusted according to $$\frac{s}{E_0} \sin \alpha$$

The shaft 42 is coupled by means of a pair of bevel gear wheels 44 to the shaft 20 and, therefore, rotated according to $\beta_0$. The cam 32, which is fast with the feeler 41 and therefore displaced according to $$\frac{s}{E_0} \sin \alpha$$

and rotated according to $\beta_0$, is so constructed that a feeler 45 mounted on the plate 1 for displacement at right angles to the shaft 42 and continuously kept in contact with the cam 32 by means of a spring 46 is adjusted according to $$\frac{s}{E_0} \cdot \frac{\sin \alpha}{\cos \beta_0}$$

viz. according to the sought magnitude $\Delta\alpha$. The feeler 45 is fast with a rack 47 in mesh with a toothed wheel 48. By means of two pairs of bevel gear wheels 49 and 50, the rotations of the toothed wheel 48 are transmitted to a shaft 51, which is therefore rotated according to $\Delta\alpha$. From this shaft 51 the said magnitude $\Delta\alpha$ can be transmitted to other mechanisms of the firing director which are not shown in the drawings.

The shaft 38 rotated according to $\alpha$ carries the one crown wheel 52 of a differential wheel gear 53, whose planet wheels 54 are coupled to the shaft 51 by means of two pairs of bevel gear wheels 55 and 56 in such a manner as to be rotated about the axis of the shaft 38 according to $$\frac{\Delta\alpha}{4}$$

so that the other crown wheel 57 of the differential wheel gear 53 and the grooved shaft 58 carrying this crown wheel 57 are rotated according to $$\alpha \pm \frac{\Delta\alpha}{2}$$

For finding $\Delta\beta$, use is made of a cam system comprising three cams 59, 60 and 61. The cam 59 is displaceable along the grooved shaft 58. By means of a pair of bevel gear wheels 62 a threaded spindle 63 parallel to the shaft 58 is coupled to the threaded spindle 6 in such a manner that a slide 64 displaced by the spindle 63 is adjusted according to $s$. The slide 64 engages by means of a fork 65 the nave 66 of the cam 59 in such a manner that this cam 59 participates in the displacements of the slide 64. The cam 59, which is thus displaced according to $s$ and rotated according to $$\alpha \pm \frac{\Delta\alpha}{2}$$

is so constructed that a feeler 67 mounted on the plate 1 for displacement at right angles to the shaft 58 and continuously kept in contact with the cam 59 by means of a spring 68 is adjusted according to $$s \cos\left(\alpha \pm \frac{\Delta\alpha}{2}\right)$$

The cam 60 is displaceable along a grooved shaft 69 which is parallel to the feeler 67 and rotated by the shaft 12 and a pair of bevel gear wheels 70 according to $\beta$. By means of a fork 71, the feeler 67 engages the nave 72 of the cam 60 in such a manner that this cam 60 participates in the adjustments of the feeler 67. The cam 60, which is thus displaced according to $$s \cos\left(\alpha \pm \frac{\Delta\alpha}{2}\right)$$

and rotated according to $\beta$ is so constructed that a hollow feeler 73 displaceable along a grooved shaft 74 and continuously kept in contact with the cam 60 by means of a spring 75 is adjusted according to $$s \cos\left(\alpha \pm \frac{\Delta\alpha}{2}\right) \sin \beta$$

By means of a pair of bevel gear wheels 76, a shaft 77, a pair of bevel gear wheels 78, a shaft 79 and a pair of bevel gear wheels 80, the shaft 74 is coupled to the shaft 29 in such a manner as to be rotated, as is the shaft 29, according to $E_0$. The cam 61, which is fast with the feeler 73 and therefore displaced according to $$s \cos\left(\alpha \pm \frac{\Delta\alpha}{2}\right) \sin \beta$$

and rotated according to $E_0$, is so constructed that a feeler 81 mounted on the plate 1 for displacement at right angles to the shaft 74 and continuously kept in contact with the cam 61 by means of a spring 82 is displaced according to $$\frac{s}{E_0} \cos\left(\alpha \pm \frac{\Delta\alpha}{2}\right) \sin \beta$$

viz. according to the sought magnitude $\Delta\beta$. The feeler 81 is fast with a rack 83 in mesh with a toothed wheel 84. By means of a pair of bevel gear wheels 85 the rotations of the toothed wheel 84 are transmitted to the shaft 16, so that, as assumed above, this shaft 16 is rotated according to $\Delta\beta$. From the shaft 16, the magnitude $\Delta\beta$ can be transmitted to other mechanisms of the firing director which are not represented in the drawings.

The shaft 12 rotated according to $\beta$ carries the one crown wheel 86 of a differential wheel gear 87 whose planet wheels 88 are coupled by means of a pair of spur gear wheels 89 to the shaft 16 in such a manner as to rotate about the axis of the shaft 12 according to $$\frac{\Delta\alpha}{4}$$

so that the other crown wheel 90 of the differential wheel gear 87 is rotated according to $$\beta \pm \frac{\Delta\beta}{2}$$

By means of a pair of bevel wheels 91 a grooved shaft 92 is coupled to the crown wheel 90 in such a manner as to rotate likewise according to $$\beta \pm \frac{\Delta\beta}{2}$$

Along the shaft 92 is displaceable a cam 93 constituting together with the cam 59 the third cam system, which serves for finding $\Delta E$. The feeler 67 engages by means of a fork 95 the nave 94 of this cam 93 in such a manner that this cam 93 participates in the displacements of the feeler 67. The cam 93, which is thus displaced according to $$s \cos\left(\alpha \pm \frac{\Delta\alpha}{2}\right)$$

and rotated according to $$\beta \pm \frac{\Delta\beta}{2}$$

is so constructed that a feeler 96 mounted on the plate 1 for displacement at right angles to the shaft 92 and continuously kept in contact with the cam 93 by means of a spring 97 is adjusted according to $$s \cos\left(\alpha \pm \frac{\Delta\alpha}{2}\right) \cos\left(\beta \pm \frac{\Delta\beta}{2}\right)$$

viz. according to the sought magnitude $\Delta E$. The feeler 96 is fast with a rack 98 in mesh with a toothed wheel 99. By means of a pair of bevel gear wheels 100 the rotations of the toothed wheel 99 are transmitted to the shaft 26, so that, as assumed above, this shaft 26 is rotated according to $\Delta E$. From the shaft 26, the magnitude $\Delta E$ can be transmitted to other mechanisms of the firing director which are not represented in the drawings.

The described apparatus works automatically as soon as the slide 7 is adjusted by means of the hand wheel 5 according to $s$ and the shafts 2, 3 and 4 are rotated according to $\alpha$, $\beta$ and $E$, respectively.

An apparatus for maintaining the Equations I, II and III would differ from the described constructional example only by a different construction of the cams 32 and 61. The cam 32 would have to be so constructed as to adjust the feeler 45 according to $$\Delta\alpha = \arcsin \frac{s \sin \alpha}{E_0 \cos \beta_0}$$

when displaced according to $$\frac{s \sin \alpha}{E_0}$$

and rotated according to $\beta_0$ and the cam 61 would have to be given a form permitting it to adjust the feeler 81 accordingly to $$\Delta\beta = \arcsin \frac{s \cos\left(\alpha \pm \frac{\Delta\alpha}{2}\right) \sin \beta}{E_0}$$

when displaced according to $$s \cos\left(\alpha \pm \frac{\Delta\alpha}{2}\right) \sin \beta$$

and rotated according to $E_0$.

The apparatus illustrated by Figure 4 serves for finding the magnitudes $\Delta\alpha$, $\Delta\beta$ and $\Delta E$ according to the Equations I$b$, II$b$ and III$b$. On account of the smaller demands made upon the accuracy of the found magnitudes, this apparatus is more simple than that shown by Figure 3, the main difference being that it lacks any differential wheel gears. In the following description, the designations are as far as possible the same as in Figure 3.

The mechanisms for calculating $\Delta\alpha$ differ from those of the apparatus shown by Figure 3 only in so far as the grooved shaft 33 is coupled by means of a pair of bevel gear wheels 34 direct to the shaft 4 operated according to $E$ and is therefore rotated according to $E$ (and not according to $E_0$), and in that the hollow feeler 37 is displaceable along the grooved shaft 2 rotated according to $\alpha$, and in that the shaft 42 is coupled by means of the pair of bevel gear wheels 44 direct to the shaft 3 operated according to $\beta$ and is therefore rotated according to $\beta$ (and not according to $\beta_0$). The feeler 45 is consequently displaced according to $$\Delta\alpha = \frac{s}{E} \cdot \frac{\sin \alpha}{\cos \beta}$$

(and not according to $$\frac{s}{E_0} \cdot \frac{\sin \alpha}{\cos \beta_0})$$

The transformation of this displacement into a rotation is effected by means of a follower mechanism. This mechanism has a contact piece 101 fast with the feeler 45 and constituting together with two contact members 102 and 103 an electric contact device. The two contact members 102 and 103 are connected to a slide 104 which is displaceable in the one or in the other direction by means of a threaded spindle 105, a pair of spur gear wheels 106 and a motor 107 when the contact piece 101 touches the contact member 102 or 103. From the spindle 105, the magnitude $\Delta\alpha$ can be transmitted to other mechanisms of the firing director which are not represented in the drawings.

The cam system for finding $\Delta\beta$ comprises two cams 108 and 109. The cam 108, which is rigidly connected to the cam 31 and therefore likewise displaceable according to $E/s$ and rotatable according to $\alpha$, is so constructed that a hollow feeler 110 displaceable along a grooved shaft 111 and continuously kept in contact with the cam 108 by means of a spring 112 is adjusted according to $$\frac{s}{E} \cdot \cos \alpha$$

The shaft 111 is coupled by means of a pair of bevel gear wheels 113 to the shaft 3 in such a manner as to be rotated according to $\beta$. The cam 109, which is fast with the feeler 110 and therefore displaced according to $$\frac{s}{E} \cos \alpha$$

and rotated according to $\beta$, is so constructed that a feeler 114 mounted on the plate 1 for displacement at right angles to the shaft 111 and continuously kept in contact with the cam 109 by means of a spring 115 is displaced according to $$\frac{s}{E} \cos \alpha \sin \beta$$

viz. according to the sought magnitude $\Delta\beta$. The transformation of this displacement into a rotation is effected by means of a follower mechanism comprising a contact piece 116 which is fast with the feeler 114 and constitutes together with two contact members 117 and 118 an electric contact device. The two contact members 117 and 118 are connected to a slide 119 which is displaceable in the one or in the other direction by means of a threaded spindle 120 and a pair of spur gear wheels 121 and a motor 122 when the contact piece 116 touches the contact member 117 or 118. From the spindle 120, the magnitude $\Delta\beta$ can be transmitted to other mechanisms of the firing director which are not represented in the drawings.

Of the two mechanisms 59 and 93 for finding $\Delta E$, 59 is displaceably mounted on the grooved shaft 2 rotated according to $\alpha$. This mechanism 59 is therefore not only displaced according to $s$ but also rotated according to $\alpha$. The cam 59 is so constructed that a hollow feeler 123 displaceable along a grooved shaft 124 and continuously kept in contact with the cam 59 by means of a spring 125 is adjusted according to $s \cos \alpha$. The shaft 124 is so coupled by means of a pair of bevel gear wheels 126 to the shaft 3 as to rotate according to $\beta$. The cam 93, which is fast with the feeler 123 and therefore displaceable according to $s \cos \alpha$ and rotatable according to $\beta$, is so constructed that a pin 127 mounted on the plate 1 for displacement at right angles to the shaft 124 and kept in continuous contact with the cam 93 by means of a spring 128 is displaced according to $s \cos \alpha \cos \beta$, viz. according to the sought magnitude $\Delta E$. The transformation of this displacement into a rotation is effected by means of a follower mechanism. This mechanism has a contact piece 129 fast with the pin 127 and constituting together with two contact members 130 and 131 an electric contact device. The two contact members 130 and 131 are connected to a slide 132 which is displaced in the one or in the other direction by means of a threaded spindle 133, a pair of spur gear wheels 134 and a motor 135 when the contact piece 129 touches the contact member 130 or 131. From the spindle 133 the magnitude $\Delta E$ can be transmitted to other mechanisms of the firing director which are not represented in the drawings.

In deducing the equations for $\Delta \alpha$, $\Delta \beta$ and $\Delta E$, it has been assumed for the sake of simplicity that the apparatus A and the gun B lie in a horizontal plane. Taking into consideration any difference in the heights of A and B does not present any difficulties either in the deduction of the corresponding equations or in the construction of a corresponding apparatus.

I claim:

1. In an apparatus for determining the instantaneous product of at least three factors constituting functions of variable magnitudes, a plurality of multiplication devices each having at least two two-dimensional cams connected for operation in series in each such device and each of which cams is shaped for producing the product of two factors, a feeler for each of said cams cooperating therewith, means for coupling the feeler for the foremost cam of each multiplication device to the following cam thereof for imparting thereto a motion corresponding to the product produced by said foremost cam, means for imparting to said following cam a motion corresponding to a third factor, and means for coupling said multiplication devices to combine the respective products thereof whereby a change in any one of said magnitudes is reflected in said combined products.

2. In an apparatus comprising a system of three multiplication devices according to claim 1 and serving for determining the three magnitudes for parallax correction required for laying an anti-aircraft gun positioned at a certain distance from the apparatus, viz, the correction of the lateral angle $\Delta \alpha$, the correction of the elevational angle $\Delta \beta$ and the correction of the range $\Delta E$, each of said three magnitudes being the product of at least three factors constituting functions of the following given values: the range E of the aircraft from the apparatus, the horizontal distance $s$ of the gun from the apparatus, the lateral angle $\alpha$ between the lines of sight from the apparatus to the aircraft and to the gun, and the elevational angle $\beta$ of the line of sight from the apparatus to the aircraft, means for coupling said three devices relatively to each other, said coupling means comprising means for so coupling one cam of one of said three devices to one cam of another device that the two motions of the one cam correspond to the two motions of the other cam, respectively, and comprising further means for so coupling one cam of one of said three devices to one cam of the second device and to one cam of the third device that said three cams have one of their two motions in common.

3. In an apparatus comprising a system of three multiplication devices according to claim 1 and serving for determining the three magnitudes for parallax correction required for laying an anti-aircraft gun positioned at a certain distance from the apparatus, viz. the correction of the lateral angle $\Delta \alpha$, the correction of the elevational angle $\Delta \beta$ and the correction of the range $\Delta E$, each of said three magnitudes being the product of at least three factors constituting functions of the following given values: the range E of the aircraft from the apparatus, the horizontal distance $s$ of the gun from the apparatus, the lateral angle $\alpha$ between the lines of sight from the apparatus to the aircraft and to the gun, and the elevatinoal angle $\beta$ of the line of sight from the apparatus to the aircraft, means for coupling said three devices relatively to each other, said means comprising differential gears for imparting to at least one cam of each said device an additional motion, and further means for coupling the gearing of the differential gear of each said device to the feeler of the rearmost cam of another device.

4. An apparatus comprising three systems of trains of two-dimensional cams as set forth in claim 1 for determining the three magnitudes for parallax correction required for laying an anti-aircraft gun positioned at a distance from the point of observation of the target, namely, the correction of the lateral angle $\alpha$, the correction of the elevational angle $\beta$ and the correction of the range E as observed to correspond to the lateral angle, elevational angle and range, respectively, at the gun position, said systems including means for introducing factors representing the observed lateral angle, elevational angle and range, respectively, each to a different one of said systems of multiplying cams, and gear means associated therewith for combining the several end products of the multiplying cams of the several systems thereof with said factors representing the observed lateral angle, elevational angle and range, respectively.

5. An apparatus comprising three systems of trains of two-dimensional cams as set forth in claim 1 for determining the three magnitudes for parallax correction required for laying an anti-aircraft gun positioned at a distance from the point of observation of the target, namely, the correction of the lateral angle $\alpha$, the correction of the elevational angle $\beta$ and the correction of the range E as observed to correspond to the lateral angle, elevational angle and range, respectively, at the gun position, said systems including means for introducing factors representing the observed lateral angle, elevational angle and range, respectively, each to a different one of said systems of multiplying cams, gear means for combining the several end products of the multiplying cams of the several systems thereof with said factors representing the observed lateral angle, elevational angle and range, respectively, and means for simultaneously adjusting one of the cams of each of said systems to correspond to changes in the distance of the gun from the point of observation.

6. An apparatus for determining the magnitudes for parallax correction required for laying an anti-aircraft gun positioned at a distance therefrom for firing at a moving target overhead, said apparatus comprising four independently operatable coordinated mechanisms for the simultaneous bringing together of four magnitudes respectively representing the horizontal distance S of the gun from said apparatus, the range E of the target from said apparatus at a certain time, the lateral angle $\alpha$ between the line of sight from said apparatus to the target and the line of sight from said apparatus to the gun at the same time, and the elevational angle $\beta$ of the line of sight from said apparatus to the target at said time, three of said mechanisms each embodying a plurality of multiplying cams each having capacity for movement in two directions differing in kind for directly transposing one of said last three magnitudes to correspond to the respective differences in the range of $E_0$ of the target from the gun, the lateral angle $\alpha_0$ and the elevational angle $\beta_0$ of the line of sight from the gun to the target from the corresponding range E, lateral angle $\alpha$ and elevational angle $\beta$ of the target from said apparatus at the same time, and a plurality of means individually controlled by the multiplying cams and responsive to changes in any of the four magnitudes involved for transmitting movement reflecting said changes each to an individual cam embodying mechanism for combining such movement with one of said magnitudes, whereby said gun may be laid on said target with respect to range, lateral angle of sight and elevation.

7. An apparatus for determining the magnitudes for parallax correction required for laying an anti-aircraft gun positioned at a fixed distance therefrom for firing at a moving target overhead, said apparatus comprising four independently operatable coordinated mechanisms for the simultaneous bringing together of four magnitudes respectively representing the horizontal distance S of the gun from said apparatus, the range E of the target from said apparatus at a certain time, the lateral angle $\alpha$ between the lines of sight from said apparatus to the target and to the gun at the same time, and the elevational angle $\beta$ of the line of sight from said apparatus to the target at said time, certain of said mechanisms each embodying a plurality of multiplying cams each having capacity for movement in two directions differing in kind for directly transposing said last three magnitudes to correspond to the respective differences in the range $E_0$ of the target from the gun, the lateral angle $\alpha_0$ and the elevational angle $\beta_0$ of the line of sight from the gun to the target from the corresponding range E, lateral angle $\alpha$ and elevational angle $\beta$ of the target from said apparatus at the same time, means for periodically adjusting the magnitude representing the horizontal distance S of the gun from said apparatus to conform to changes from time to time in the position of the gun, and a plurality of means individually controlled by the multiplying cams and responsive to changes in any of the four magnitudes involved for transmitting movement reflecting said changes each to an individual cam embodying mechanism for combining such movement with one of said magnitudes, whereby said gun may be laid on said target with respect to range, lateral angle of sight and elevation irrespective of its distance from said apparatus.

8. In an apparatus for determining the magnitudes for parallax correction required for laying an anti-aircraft gun positioned at a distance therefrom comprising individual means for introducing data corresponding to each of four magnitudes assumed to be known, these magnitudes being the range E of the aircraft from the apparatus, the lateral angle $\alpha$ between the lines of sight from the apparatus to the aircraft and to the gun, and the elevational angle $\beta$ of the line of sight from the apparatus to the aircraft, the combination of three inter-dependent cam systems coupled to said data introducing means and multiplication devices associated therewith, each of said cam systems comprising a plurality of multiplying cams, each consisting of a two-motion cam and a feeler movable relatively thereto, means for imparting two motions differing in kind to the respective cams, means for keeping the appertaining feeler in contact with each said cam, the feeler appertaining to the foremost of two successive cams being coupled to the cam of the rearmost of these two cams, and the feeler of the rearmost of each such pair of cams being provided with out-put transmitting means, respectively indicating functions of the range, lateral angle of sight and elevational angle of the line of sight from the gun to the aircraft, and means controlled by said multiplying cams and responsive to changes in any of the magnitudes involved for coupling said cam systems, whereby changes in any of said four magnitudes are reflected in the entire output of said apparatus.

9. Apparatus for obtaining simultaneous solutions of equations of the general form:

$$\Delta\alpha = \frac{s \sin \alpha}{E \cos \beta}$$

$$\Delta\beta = \frac{s \cos \alpha \sin \beta}{E}$$

$$\Delta E = s \cos \alpha \cos \beta$$

wherein $s$ is a fixed quantity and $\alpha$, $\beta$ and E are variable quantities whose magnitudes are known at any given instant, said apparatus comprising a plurality of interconnected systems of two-dimensional cams connected for operation in trains, each such cam being arranged for movement of two different kinds and shaped for producing the product of two factors, independent means for simultaneously introducing a plurality of said magnitudes individually to a corresponding number of said systems, said means serving severally for interconnecting said systems, and means cooperating with the final cam of each of said trains for receiving and transmitting the respective products constituting the solutions to said equations.

KARL PAPELLO.